United States Patent
Wellford, Jr.

[15] 3,706,662
[45] Dec. 19, 1972

[54] NON-POLLUTING WASTE REDUCER AND METHOD

[72] Inventor: Walker L. Wellford, Jr., 135 St. Albans, Memphis, Tenn. 38111

[22] Filed: July 1, 1971

[21] Appl. No.: 158,813

[52] U.S. Cl. ..........................210/63, 110/8, 201/21, 204/129, 210/149, 210/152
[51] Int. Cl. ..............................................C02c 5/04
[58] Field of Search ............204/129; 201/21, 25, 37; 110/8 R; 210/63, 152, 143, 149

[56] References Cited

UNITED STATES PATENTS

| | | | |
|---|---|---|---|
| 2,098,629 | 11/1937 | Knowlton | 204/129 X |
| 3,130,146 | 4/1964 | Plaster | 201/37 X |
| 2,238,367 | 4/1941 | Mohr et al. | 201/21 X |
| 3,262,872 | 7/1966 | Rhodes et al. | 204/129 X |
| 1,189,638 | 7/1916 | Testrup et al. | 201/21 X |

FOREIGN PATENTS OR APPLICATIONS

| | | | |
|---|---|---|---|
| 809,948 | 4/1969 | Canada | 110/8 R |
| 1,438,870 | 4/1966 | France | 110/8 R |

Primary Examiner—Michael Rogers
Attorney—Daniel P. Chernoff et al.

[57] ABSTRACT

An apparatus and method for heating and decomposing organic and inorganic household, industrial and commercial wastes to quickly and economically decrease their volume without thereby polluting the air. The device comprises a housing with a removable cover for inserting refuse into the housing. With the cover in place the housing serves as a sealed treatment chamber for the waste. Heating of the wastes is accomplished by an ignition and burner system within the housing which combines hydrogen and oxygen gases and applies the heat generated by their combustion directly to the waste material. The hydrogen and oxygen gases are manufactured by an electrolytic generator comprising cells such as the Knowles cell containing a suitable alkali electrolyte such as potassium hydroxide. The amount of oxygen fed to the burner from the electrolytic generator is limited so that all oxygen is combined with the hydrogen to produce heat, and no excess oxygen is available for oxidizing the waste material. A thermostatic valve responsive to a temperature sensor inside the housing continually limits the oxygen supply unless the housing temperature drops below a predetermined temperature, in which case the oxygen is increased until the temperature is restored. Conversely, more hydrogen is supplied to the burner than is necessary to combine with the oxygen in combustion, and the excess hydrogen reduces rather than oxidizes the waste material, resulting in the formation of hydrocarbon gases and carbon rather than carbon dioxide and ashes. The hydrocarbon gases, together with the water vapor which results from the combustion of hydrogen and oxygen and from the decomposition of the waste material, are collected in the sealed housing, and condensed to avoid polluting the air. Those hydrocarbons which do not condense may be burned to provide additional heat for decomposing the waste material. The condensed gases are fed into the electrolytic generator where the water is used to regenerate the hydrogen and oxygen gases for the burner system. The condensed hydrocarbons may be periodically removed and used for commercial purposes if the process is practiced on an industrial scale, or alternatively they can be disposed of as sewage. The housing includes a grating for holding the waste material above the burner, and a base portion located below the grating for collecting any solid residues which are not vaporized in the heating process and drop through the grating into the base portion. These solid materials are periodically removed from the system and either used for commercial purposes or disposed of.

14 Claims, 2 Drawing Figures

PATENTED DEC 19 1972 3,706,662

NON-POLLUTING WASTE REDUCER AND METHOD

BACKGROUND OF THE INVENTION

This invention relates to improvements in waste treatment devices for decreasing the volume of such waste without thereby polluting the air. More specifically the apparatus is of the type wherein the waste material is heated and decomposed under limited oxygen in a housing sealed from the atmosphere so as to avoid oxidation of the waste material.

In sealed waste treatment devices of the type known to the art and shown for example in Rekate U.S. Pat. No. 3,383,228 and Cameron U.S. Pat. No. 3,525,673, waste material is heated in a sealed enclosure by the injection of steam from a boiler or steam generator external of the enclosure. These devices include means for condensing and collecting at least a portion of the volatiles produced by decomposition of the waste material, and thereby at least partially prevent air pollution. Moreover they avoid substantial oxidation of the waste material, which is desirable in order to decrease the volume of the residue and prevent the formation of explosive oxide gases. However, the utilization of steam from an external boiler to distill or decompose wastes instead of applying the heat of combustion directly to the waste material requires very expensive equipment and is slow because of practical limits on the rate at which heat can be transferred to the waste by such means. Although such a system might be utilized industrially, it could never by used for household purposes.

If a burner system utilizing hydrocarbon fuels were employed externally of the above described sealed enclosure to heat the waste material, the decomposition process would of course be accelerated and significantly higher temperatures could be reached. However the combustion of hydrocarbon fuel to decompose waste material is not only expensive but inevitably adds to air pollution since carbon dioxide results from combustion of the fuel and cannot be economically condensed except in very large equipment.

Moreover, although sealed waste distillation devices of the prior art may avoid oxidation of the waste material, no commercially useful products, such as hydrocarbons, are produced from these prior art processes. In addition the failure of such processes to use a major part of the water generated by the decomposition of the waste material leaves a large volume of contaminated liquid to be disposed of, which not only adds to water pollution but also entails considerable additional expense.

Accordingly a need exists for an inexpensive method and device for quickly decreasing the volume of ordinary wastes by applying combustion heat directly to the wastes, without causing air pollution or the formation of oxides and without leaving a large volume of useless liquid to dispose of, and preferably producing a commercially useful end product.

SUMMARY OF THE PRESENT INVENTION

The present invention is directed to an apparatus and method of the general type described in which organic and inorganic household, industrial or commercial wastes are decomposed in a sealed housing by the combustion of hydrogen and oxygen gases supplied to a burner inside the housing. The oxygen supply to the burner is limited so that all of the oxygen is consumed in combustion with the hydrogen, and no oxygen remains for the formation of waste oxides. A thermostatically controlled valve continually modulates the flow of oxygen to the burner in response to a temperature sensor inside the sealed housing to avoid limiting the oxygen supply to the extent that heat generation is insufficient. In contradistinction to the supply of oxygen, hydrogen is supplied to the burner in excess of the amount necessary for combustion. The excess hydrogen is utilized to chemically reduce, rather than oxidize, the waste material and form commercially useful hydrocarbons such as ethylene. These hydrocarbon gases, and the water vapor which results from combustion of the oxygen and hydrogen fuels and from the decomposition of the waste materials, are collected in the sealed housing to prevent pollution of the air. A condenser, which may comprise merely an outer shell of the incinerator housing, liquifies the hydrocarbon gases and water vapors and conducts them into an electrolytic generator which uses the water vapor component of the condensed gases to generate the oxygen and hydrogen fuels for the incinerator. This water regeneration obviates the need for disposing of a large portion of the liquid condensate. Periodically the hydrocarbon condensates are removed from the electrolyte bath and are used for commercial purposes or otherwise disposed of. Any solid residues which are not vaporized in the housing are collected in the base portion of the housing and periodically collected or disposed of.

The provision of a waste treatment device utilizing the combustion of hydrogen and oxygen gases to decompose waste materials introduces a number of significant advantages not found in waste disposal systems of the prior art. The heating equipment is simple and inexpensive, has no moving parts, and yet is extremely effective and rapid since it utilizes the heat of combustion applied directly to the waste rather than heat from some external source. In addition, oxygen is furnished in a quantity sufficient only to produce combustion of the hydrogen gas, and oxidation of the waste material is thereby avoided. Moreover, the oxygen-hydrogen combustion process itself produces no carbon dioxide, as would be the case if a hydrocarbon fuel were used, but rather produces only water vapor which is non-polluting and easily condensible.

The use of an electrolytic generator to produce the hydrogen and oxygen gases not only reduces the cost of supplying fuel for the device but provides for regeneration of a large portion of the condensed vapors from the decomposition of the waste material, leaving only a small volume of condensate to be disposed of. Furthermore the utilization of excess hydrogen in the incinerator ensures that these disposable liquids will be hydrocarbons, which may be commercially usable. Finally, the use of a sealed rather than an open housing for the waste material prevents air pollution while at the same time ensuring temperatures high enough to melt certain inorganic wastes such as metal and glass.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figure 2:
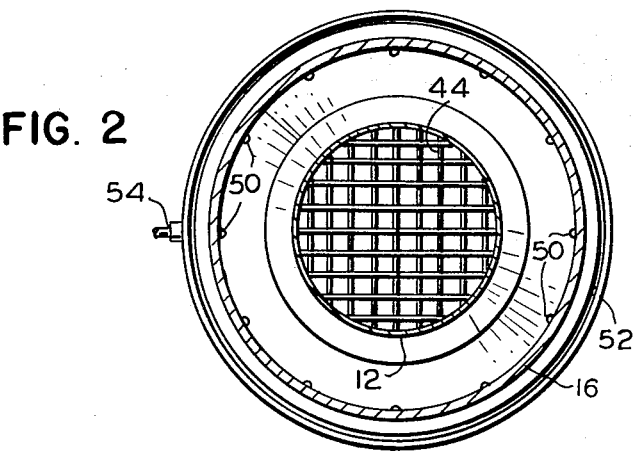
FIG. 2 is a sectional view of the device taken along line 2—2 of FIG. 1.
Figure 1:
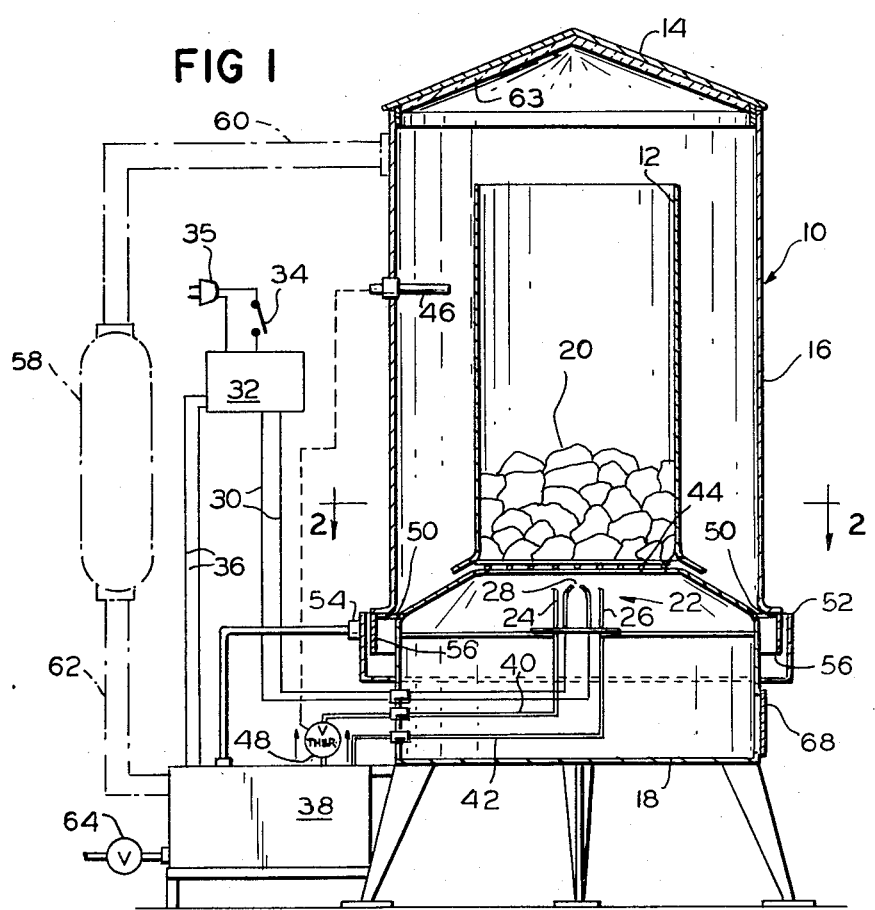
FIG. 1 is a vertical sectional view of an embodiment of the waste treatment device suitable for household use, with certain of the elements shown schematically.

The embodiment of the waste treatment device suitable primarily for household use comprises an open waste container 12 surrounded by a three-piece outer housing designated generally as 10 in FIG. 1. The housing includes a removable cover 14 for depositing the waste material in the container 12, an intermediate portion 16, and a base portion 18. The open container 12 is preferably constructed of a suitable, highly heat-resistant alloy steel. The removable cover may be constructed of aluminum, and the other portions 16 and 18 of the outer housing are preferably of low carbon steel. The cover also functions as a pressure relief device should an explosion occur within the housing by raising up and thus preventing fragmentation of the housing.

The three elements 14, 16, and 18 of the outer housing each have mating surfaces which permit their assembly with one another in a manner so as to seal the open container 12 and the waste material 20 deposited therein from exposure to the surrounding air when cover 14 is in place. This feature is important not only for the prevention of air pollution, but also to permit unusually high temperatures and ensure proper chemical activity within the housing for reasons to be described hereafter.

The waste material 20, as referred to herein, comprises primarily organic substances normally encountered in household, industrial and commercial wastes. These organic substances are primarily vegetable or animal wastes of relatively high moisture content which decompose into a carbon residue and water vapor on the application of heat. Certain inorganic substances such as glass bottles and tin cans may also be included in the waste material 20.

Within the base portion 18 of the outer housing 10 is a burner designated generally as 22 for heating and decomposing the waste material 20. Burner 22 comprises two gas outlet ports 24 and 26 respectively, and a pair of electrodes 28 for generating an intermittant high voltage spark to ignite the gases emitted from ports 24 and 26. Electrodes 28 are connected by a pair of leads 30 to a terminal box 32, which in turn is coupled through an on-off switch 34 and plug 35 with a normal household source of alternating current. Terminal box 32 contains a standard transformer and rectifier circuit for conversion of AC to DC current. Ignition leads 30 are coupled with this circuit and include a suitable condenser connected in parallel with electrodes 28. Terminal box 32 is conventional in all respects and forms no part of the present invention.

Also connected to terminal box 32 and drawing power therefrom are leads 36, one of which is connected to a cathode and the other of which is connected to an anode of an electrolytic generator 38. The generator preferably comprises cells such as a Knowles cell equipped with a nickel-plated anode and cobalt-plated cathode. The cathode and anode (not shown) are immersed in an alkali electrolyte bath, which preferably comprises potassium hydroxide but which might also comprise any other electrolyte suitable for the disassociation of water to produce hydrogen and oxygen gas. When the rectified electrical current is passed between the cathode and anode through the electrolyte bath, the well known process of water electrolysis takes place, with two molecules of hydrogen gas being generated at the cathode for every molecule of oxygen gas which is generated at the anode. The oxygen and hydrogen gases are separately collected within the electrolytic generator 38, and the oxygen gas so collected is conducted to burner 22 by means of conduit 40 which communicates with gas outlet port 24. The hydrogen gas is conducted to the burner via conduit 42 which communicates with gas outlet port 26.

Upon the closure of electrical switch 34, both the ignition system 28, 30 and the electrolytic generator 38 are activated, and generator 38 begins supplying hydrogen and oxygen gas to the respective gas outlet ports of burner 22. As soon as the two gases mix in the region of outlet ports 24 and 26 they are ignited by the spark produced by electrodes 28, and combustion of the two gases occurs with the liberation of much heat and the formation of water vapor. Burner 22 is located immediately below a heat resistant monel grate 44 which supports the waste material 20, and the combustion heat is applied upwardly through the grate directly into the waste material. Initially, as the interior of housing 10 is being heated by burner 22, the hydrogen and oxygen gases are supplied to the burner in the same ratio as they are produced by generator 38, i.e., two molecules of hydrogen for every molecule of oxygen, or 1 gram of hydrogen for every 8 grams of oxygen. This is the proper ratio for the complete combination of each gas with the other through combustion, with no excess gas of either type being left over. When the temperature within housing 10 reaches a predetermined level however, a temperature sensor 46 inside the housing adjusts a thermostatic restricting valve 48 interposed in the oxygen conduit 40 to restrict the flow of oxygen to burner 22. Valve 48 thereafter continues to restrict the flow of oxygen to the burner, shunting the excess oxygen produced by generator 38 to the surrounding air, unless the temperature within the housing falls below a predetermined level. If the temperature does so fall, valve 48 is adjusted in response to temperature sensor 46 to provide less restriction and thus a greater supply of oxygen to the burner 22 until the predetermined temperature level is restored, at which time valve 48 tends further to restrict the oxygen supply.

Temperature sensor 46 can comprise any suitable electrical or mechanical temperature sensor known to the art, and similarly valve 48 can comprise any of several known electrically or mechanically responsive thermostatic valves designed for gas flow modulation. For example, valve 48 could be a simple two-position butterfly valve providing no restriction in one position and a fixed restriction in the other position, controlled by an electric solenoid actuated in response to a thermistor or thermocouple which opens the valve at low housing temperatures and causes it to restrict oxygen flow when a predetermined housing temperature is reached. Alternatively a valve capable of variable restriction could be used for more precise modulation.

From the foregoing description of the manner in which oxygen supplied to burner 22 is limited, it is apparent that the absence of a corresponding limitation on the supply of hydrogen gas to the burner will result in a supply of hydrogen gas in excess of that necessary for combustion. Furthermore, since the hydrogen gas outlet port 26 is not separated from the waste material 20, it is apparent that the excess hydrogen will freely permeate the waste material while it is being heated. Since the interior of the housing 10 is sealed from the oxygen of the outside air by the three coupled elements 14, 16 and 18 of the outer incinerator housing, and since valve 48 does not allow any oxygen in excess of that needed for combustion with the hydrogen to be supplied to outlet port 24, no oxygen is available to combine with the carbon constituent of the organic waste material 20 upon its decomposition. Thus no carbon dioxide gas, or other waste oxides, can be formed. Instead, the excess hydrogen available inside the housing 10 combines with the carbon to form hydrocarbon gases, such as ethylene, by a process of chemical reduction rather than oxidation.

Besides the production of hydrocarbon volatiles, a substantial amount of water vapor is produced by the decomposition of the organic waste material. This water vapor combines with the water vapor produced by the combustion of the hydrogen and oxygen fuels and, together with the hydrocarbon volatiles, is collected within the sealed housing 10 and thereby prevented from polluting the air. The water vapor and hydrocarbon volatiles collected within the housing are thereafter condensed to liquid form. Those hydrocarbons which do not condense can be burned to provide additional heat for decomposing the waste material.

Condensation can be effected in any of a number of alternative ways, two of which are shown in FIG. 1. One alternative is to use the intermediate portion 16 of the outer housing 10 as a condenser. In such case portion 16 has no insulation and the exterior air cools the walls of portion 16 sufficiently that the volatiles and water vapor condense on the walls and run down the sides of the housing. Near the bottom of portion 16, where it rests on base portion 18, a number of drainage ports 50 are provided through which the condensate drains into an annular gutter 52 attached to base portion 18. A drain 54 located near the top of the gutter conducts the condensate away. Note that since drain 54 is located above the lower extremity of flange 56 of intermediate portion 16, the level of fluid in the gutter 52 is always high enough to form a liquid seal between base portion 18 and intermediate portion 16 to prevent exposure of the waste material to the air.

An alternative method of condensation is illustrated by the provision of an exterior condenser 58, preferably of the air-cooled type but which may be water-cooled, which receives the gaseous volatiles and water vapor from within housing 10 through conduit 60 and discharges the condensate through drain 62. If an exterior condenser such as 58 were utilized, intermediate portion 16 would be insulated to prevent condensation inside the housing 10, and a sealing gasket between intermediate portion 16 and base portion 18 would replace drainage ports 50. Regardless of which condensation system is used, it is desirable that cover 14 include insulation 63 to prevent condensation of the vapors as they emerge from inner container 12.

Drain 54 and alternative drain 62 empty into the electrolyte bath of electrolytic generator 38. There the condensed water vapor component of the condensate is utilized for regeneration of the hydrogen and oxygen gases supplied to burner 22. The electrolytic regeneration process effectively disposes of a majority of the condensate, leaving only the condensed hydrocarbons to collect in the electrolyte bath. As the electrolyte becomes contaminated with these hydrocarbons, it is periodically emptied by opening valve 64 and either permitting it to drain into the sewer system or collecting it for commercial utilization of the hydrocarbons. A fresh electrolyte is placed in the generator 38 and the apparatus is ready for further use.

Any solid waste residues which have not been vaporized by the heating of the waste material fall through the grate 44 and are collected in the base portion 18 of the housing 10. These solid residues will consist primarily of carbon mixed with certain inorganic substances such as metal or glass which may have been present in the organic waste material 20. Because no outside air is allowed inside the housing 10 during the heating of the waste material by burner 22, the cooling effect of such non-combustible gases as nitrogen is avoided during the heating process. This enables burner 22 to heat the waste material 20 to a much higher temperature with the same amount of fuel than would otherwise result if combustion in air were utilized. The high temperature enables the metal and glass objects, such as tin cans and bottles normally found in household wastes, to be melted and the residue to be collected in base portion 18. From time to time the carbon and inorganic substances collected in the base portion can be easily removed by any convenient means, for example through a door such as 68 in the side of the base portion 18.

Although the waste treatment device shown in FIG. 1 is small in size and intended primarily for everyday household use, it is well within the scope of the invention that the novel process and apparatus disclosed herein for waste treatment might also be utilized on a larger industrial scale. In such case it would probably be economically advantageous to collect for further use the condensed hydrocarbons and even perhaps the solid residues which result from decomposition of the waste material. On the other hand, where the device is used for household purposes, the hydrocarbon condensate and solid residues would probably be disposed of simply through conventional sewage and waste collection systems. Of course in either case the volume of liquid sewage and solid residues to be disposed of constitutes a mere fraction of the original volume of the waste material before decomposition. The volume of this remaining material is especially minimized by the prevention of waste oxidation during heating of the waste material, and by the utilization of the water component of the organic waste material to generate the gases for the burner 22.

The terms and expressions which have been employed in the foregoing abstract and specification are used therein as terms of description and not of limitation, and there is no intention in the use of such terms and expressions, of excluding equivalents of the features shown and described or portions thereof, it being recognized that the scope of the invention is defined and limited only by the claims which follow.

What is claimed is:

1. A device for heating, decomposing and chemically reducing organic waste material comprising:
   a. a housing for holding said waste material while it is being heated, said housing including means for collecting by-products resulting from the decomposition of said waste material;
   b. means for introducing hydrogen gas into said housing while said waste material is being heated to chemically reduce said waste material by forming hydrocarbon compounds therewith;
   c. support means within said housing for holding said waste material apart from said means for introducing hydrogen gas into said housing; and
   d. means coupled with said housing for converting at least a portion of said by-products resulting from the decomposition of said waste material into said hydrogen gas used for reducing said waste material.

2. The device of claim 1 wherein said means for converting said by-products into hydrogen gas includes means for condensing at least the water portion of said products, and electrolytic generator means for disassociating said condensed water to produce said hydrogen gas.

3. The device of claim 2 including means coupled with said housing for collecting said hydrocarbon compounds and conducting them into said electrolytic generator means for storage therein.

4. A device for heating and decomposing organic waste material comprising:
   a. a housing for holding said waste material while it is being heated, said housing including means for collecting by-products resulting from the decomposition of said waste material;
   b. burner means within said housing for heating said waste material by the combustion of hydrogen and oxygen gases supplied to said burner means;
   c. support means within said housing for holding said waste material apart from said burner means; and
   d. means coupled with said housing for converting at least a portion of said by-products resulting from the decomposition of said waste material into said oxygen and hydrogen gases used for heating said waste material.

5. A device for heating, decomposing and chemically reducing organic waste material comprising:
   a. a housing for holding said waste material including means for sealing said waste material from exposure to the surrounding air to inhibit the oxidation of said waste material by oxygen in the air;
   b. means for simultaneously supplying both oxygen and hydrogen gas flows to said waste material inside said sealed housing;
   c. means for igniting said oxygen and hydrogen gases inside said housing for heating said waste material; and
   d. control means for preventing said oxygen flow from exceeding that necessary to combine in combustion with all of said hydrogen flow, said control means including means responsive to temperature variations within said housing for varying the ratio between said respective oxygen and hydrogen gas flows so as to limit said oxygen flow without correspondingly limiting said hydrogen flow, thereby causing said hydrogen flow to exceed that necessary to combine in combustion with all of said oxygen flow.

6. A method for treating organic waste material which comprises:
   a. placing said organic waste material within an enclosure;
   b. adding a mixture comprising a non-carbonaceous combustible fuel and oxygen to the interior of said enclosure so as to expose said waste material directly to said mixture;
   c. igniting said mixture within said enclosure to thereby heat and decompose said waste material;
   d. chemically reducing said waste material by injecting hydrogen gas into said enclosure to form hydrocarbon gases; and
   e. during the heating and chemical reduction of said waste material, substantially preventing the formation within said enclosure of carbon monoxide and carbon dioxide gases by limiting the amount of oxygen added to the interior of said enclosure to an amount insufficient to combine with all of said fuel and hydrogen gas simultaneously added to said enclosure.

7. The method of claim 6, further comprising the step of collecting and condensing said hydrocarbon gases.

8. The method of claim 6, further comprising the step of removing said hydrocarbons from said enclosures and thereafter burning at least a portion of said hydrocarbons.

9. A device for heating, decomposing and chemically reducing organic waste material comprising:
   a. a housing for holding said waste material while it is being heated, said housing including means for collecting by-products resulting from the decomposition of said waste material;
   b. conversion means coupled with said housing for converting at least a portion of said by-products into hydrogen gas and oxygen gas, said conversion means including means for condensing at least the water portion of said by-products and electrolytic generator means for disassociating said condensed water to produce said hydrogen and oxygen gases;
   c. burner means located within said housing so as to be exposed to said waste material, said burner means being coupled both to the hydrogen and oxygen outlets of said electrolytic generator means and having control means for limiting the amount of oxygen which said burner means receives from said generator means to an amount insufficient to combine with all of the hydrogen gas simultaneously received from said generator means, thereby leaving excess hydrogen gas in said housing to chemically reduce said waste material; and
   d. means for relieving said electrolytic generator means of that portion of its produced oxygen which is prevented from being supplied to said burner means by said control means.

10. A method for treating organic waste material which comprises:
   a. placing said organic waste material within an enclosure;
   b. adding a mixture comprising combustible fuel and oxygen to the interior of said enclosure so as to expose said waste material directly to said mixture;
   c. igniting said mixture within said enclosure to thereby heat and decompose said waste material;
   d. chemically reducing said waste material by injecting hydrogen gas into said enclosure to form hydrocarbon gases;
   e. during the heating and chemical reduction of said waste material, substantially preventing the formation within said enclosure of carbon monoxide and carbon dioxide gases; and
   f. collecting the by-products resulting from the decomposition of said organic waste material, converting at least a portion of said by-products into oxygen and hydrogen gases, and utilizing the resultant hydrogen to provide at least part of said injected hydrogen gas.

11. A method for treating organic waste material comprising:
   a. heating said waste material within a housing to thereby decompose said waste material;
   b. chemically reducing said waste material within said housing while said waste material is being heated by introducing hydrogen gas into said housing to form hydrocarbon compounds with said waste material; and
   c. collecting by-products of said treated waste material, converting at least a portion of said collected by-products into hydrogen gas and introducing said hydrogen gas produced by said conversion step into said housing to perform said chemical reduction step.

12. The method of claim 11 wherein said conversion step comprises the step of electrolytically disassociating the water portion of said waste by-products to produce said hydrogen gas.

13. A method for treating organic waste material comprising:
   a. heating said waste material within a housing by the combustion of hydrogen and oxygen gases supplied to a burner;
   b. collecting the by-products of said heated waste material;
   c. converting at least a portion of said collected by-products into oxygen and hydrogen gases; and
   d. conducting said hydrogen and oxygen gases produced by said conversion step to said burner for heating said waste material.

14. The method of claim 13 wherein said conversion step comprises the step of electrolytically disassociating the water portion of said waste by-products to produce said oxygen and hydrogen gases.

* * * * *